(12) United States Patent
Singaravelu et al.

(10) Patent No.: US 11,258,766 B2
(45) Date of Patent: Feb. 22, 2022

(54) VNF PACKAGE SIGNING SYSTEM AND VNF PACKAGE SIGNING METHOD

(71) Applicant: NEC CORPORATION, Tokyo (JP)

(72) Inventors: Pradheepkumar Singaravelu, Chennai (IN); Anand Raghawa Prasad, Tokyo (JP); Sivabalan Arumugam, Chennai (IN); Hironori Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 205 days.

(21) Appl. No.: 16/484,007

(22) PCT Filed: Feb. 6, 2018

(86) PCT No.: PCT/JP2018/004009
§ 371 (c)(1),
(2) Date: Aug. 6, 2019

(87) PCT Pub. No.: WO2018/147276
PCT Pub. Date: Aug. 16, 2018

(65) Prior Publication Data
US 2020/0099660 A1 Mar. 26, 2020

(30) Foreign Application Priority Data
Feb. 7, 2017 (IN) .............................. 201711004439

(51) Int. Cl.
*H04L 29/06* (2006.01)
*G06F 21/33* (2013.01)
(Continued)

(52) U.S. Cl.
CPC .......... *H04L 63/0272* (2013.01); *G06F 21/33* (2013.01); *H04L 9/083* (2013.01);
(Continued)

(58) Field of Classification Search
CPC ... H04L 63/0272; H04L 9/083; H04L 9/3268; H04L 41/28; H04L 63/0823; H04L 63/126; H04L 41/082; H04L 9/0897; G06F 21/33
See application file for complete search history.

(56) References Cited

U.S. PATENT DOCUMENTS

2016/0127333 A1 5/2016 Sood et al.
2017/0078098 A1* 3/2017 Marquardt ............ G06F 21/575
(Continued)

FOREIGN PATENT DOCUMENTS

| CN | 105577637 A | 5/2016 |
| CN | 105917690 A | 8/2016 |

(Continued)

OTHER PUBLICATIONS

ETSI GS NFV-MAN 001 V1.1.1, Network Functions Virtualisation (NFV); Management and Orchestration, Dec. 2014, pp. 1-184.
(Continued)

*Primary Examiner* — John B King
(74) *Attorney, Agent, or Firm* — Sughrue Mion, PLLC

(57) ABSTRACT

A VNF package signing system, comprises an orchestration unit sending an acknowledge of receiving a VNF package including the VNF image, in response to the receiving the VNF package from a sender, a storage unit storing the VNF package and generating a certificate for the VNF package using a private key for at least generating a certificate for signing the VNF package and a HISEE (Hardware Isolated Secured Execution Environment) unit providing the private key in response to the request from the storage unit. The orchestration unit sends the acknowledge of receiving a VNF package when the storage unit successes generating the certificate of the VNF package.

18 Claims, 14 Drawing Sheets

(51) Int. Cl.
*H04L 9/08* (2006.01)
*H04L 9/32* (2006.01)
*H04L 12/24* (2006.01)

(52) U.S. Cl.
CPC ............ *H04L 9/3268* (2013.01); *H04L 41/28* (2013.01); *H04L 63/0823* (2013.01); *H04L 63/126* (2013.01)

(56) References Cited

U.S. PATENT DOCUMENTS

| | | | |
|---|---|---|---|
| 2018/0026794 A1 | 1/2018 | Nakano et al. | |
| 2018/0034801 A1 | 2/2018 | Nakano et al. | |
| 2018/0114012 A1* | 4/2018 | Sood | ........................ G06F 21/53 |
| 2018/0131557 A1* | 5/2018 | Chou | ..................... H04L 5/0055 |
| 2019/0253264 A1* | 8/2019 | Singaravelu | .......... H04L 9/3263 |

FOREIGN PATENT DOCUMENTS

| | | | | |
|---|---|---|---|---|
| EP | 3249882 A1 | * | 11/2017 | ............. H04L 63/08 |
| WO | WO-2015143651 A1 | * | 10/2015 | ............. H04L 41/20 |
| WO | WO-2016015207 A1 | * | 2/2016 | ............. H04L 29/08 |
| WO | 2016/125553 A1 | | 8/2016 | |
| WO | 2016/132783 A1 | | 8/2016 | |
| WO | WO-2016172978 A1 | * | 11/2016 | ............. H04L 41/12 |
| WO | WO-2018047399 A1 | * | 3/2018 | ........... H04L 9/0877 |
| WO | WO-2018147276 A1 | * | 8/2018 | ........... H04L 9/3268 |

OTHER PUBLICATIONS

Pradheepkumar Singaravelu, "Usecase-Validation of VNF package during On-board", European Telecommunications Standards Institute (ETSI), Dec. 12, 2016, pp. 1-14.
International Search Report for PCT/JP2018/004009 dated Jun. 1, 2018 [PCT/ISA/210].
Written Opinion for PCT/JP2018/004009 dated Jun. 1, 2018 [PCT/ISA/237].
Communication dated Nov. 4, 2020 from the Japanese Patent Office in Application No. 2019-542494.
Chinese Office Action for CN Application No. 201880010781.9 dated Apr. 6, 2021 with English Translation.

* cited by examiner

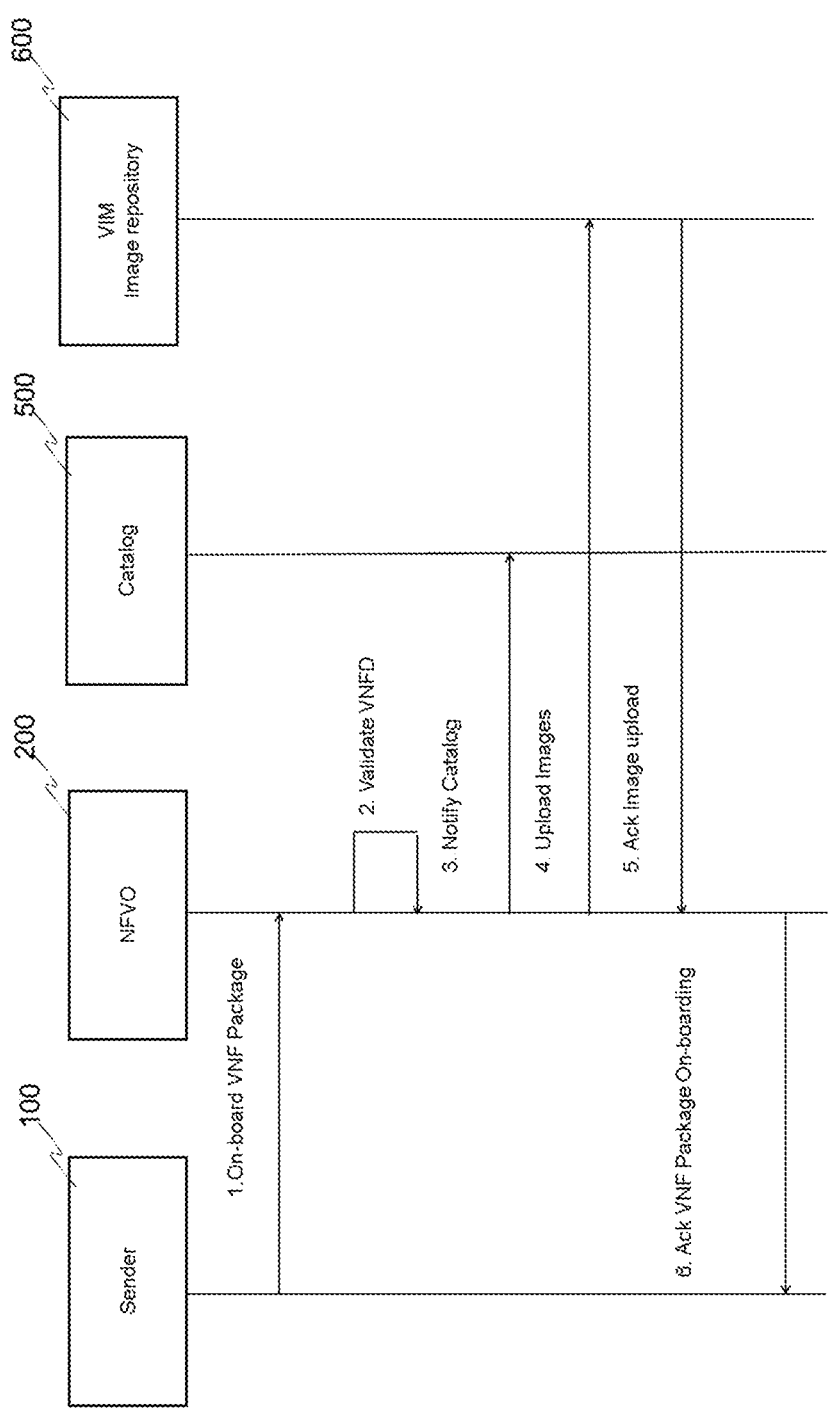
[Fig. 1]

[Fig. 2]
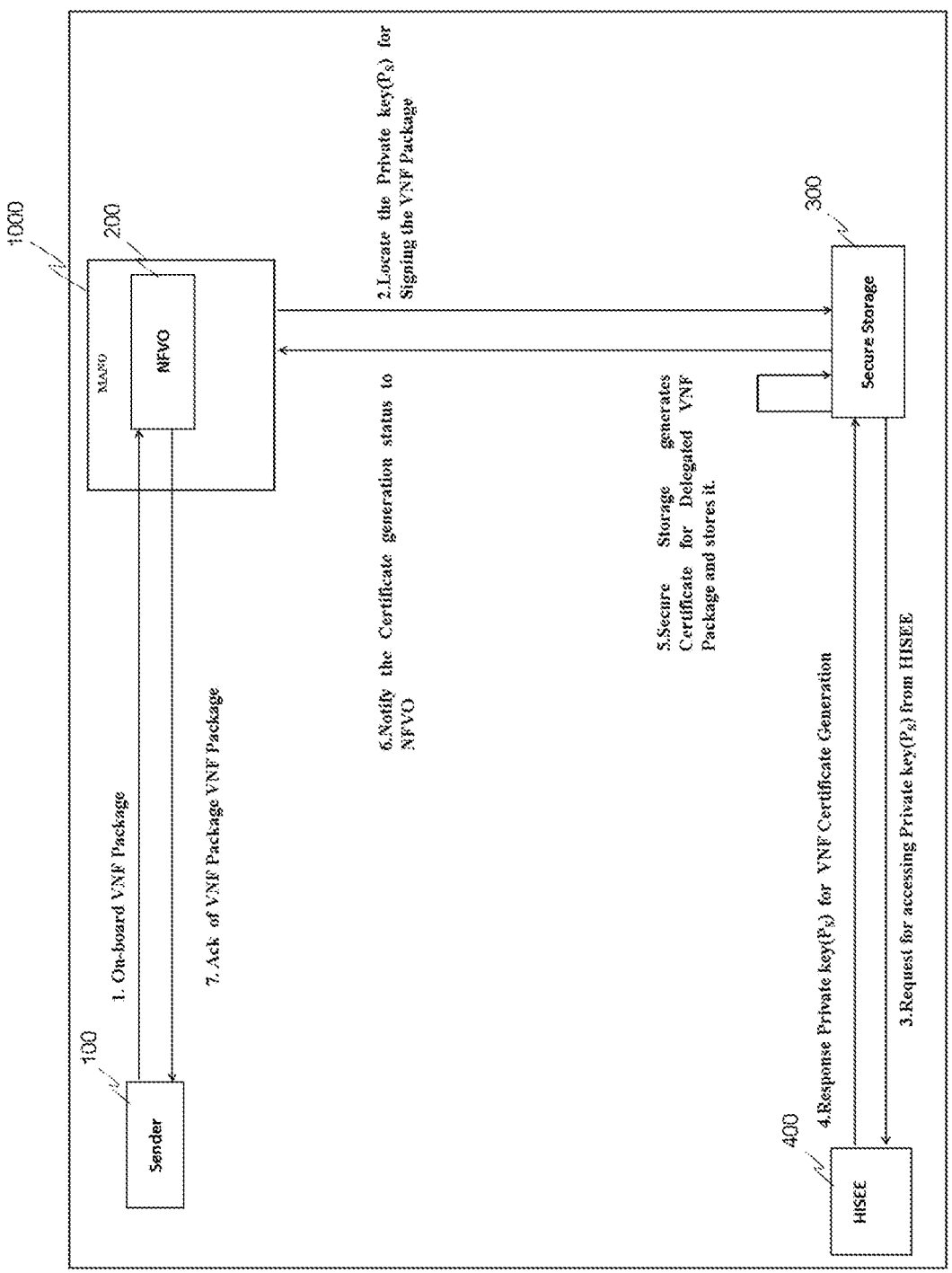

[Fig. 3]
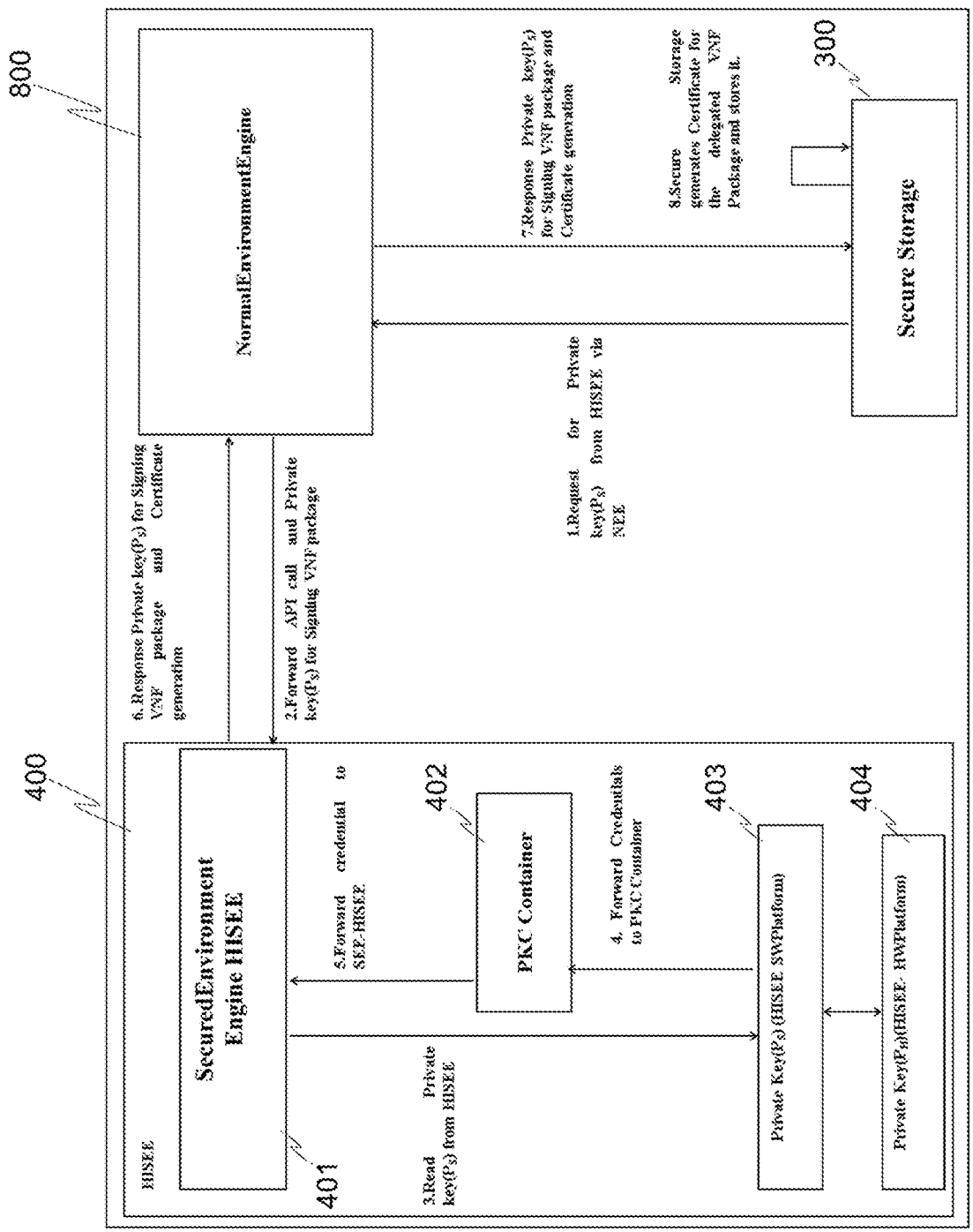

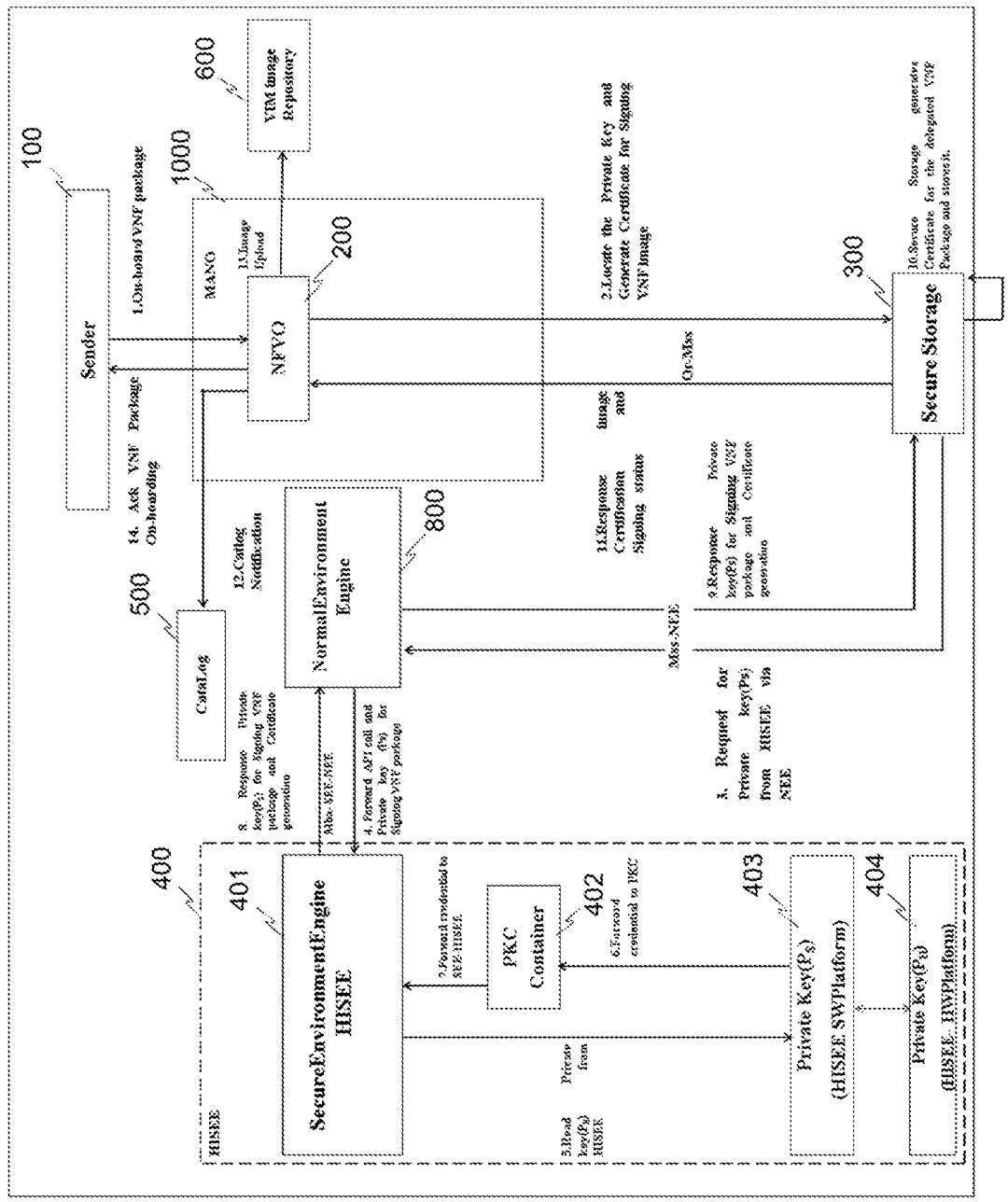
[Fig. 4]

[Fig. 5]
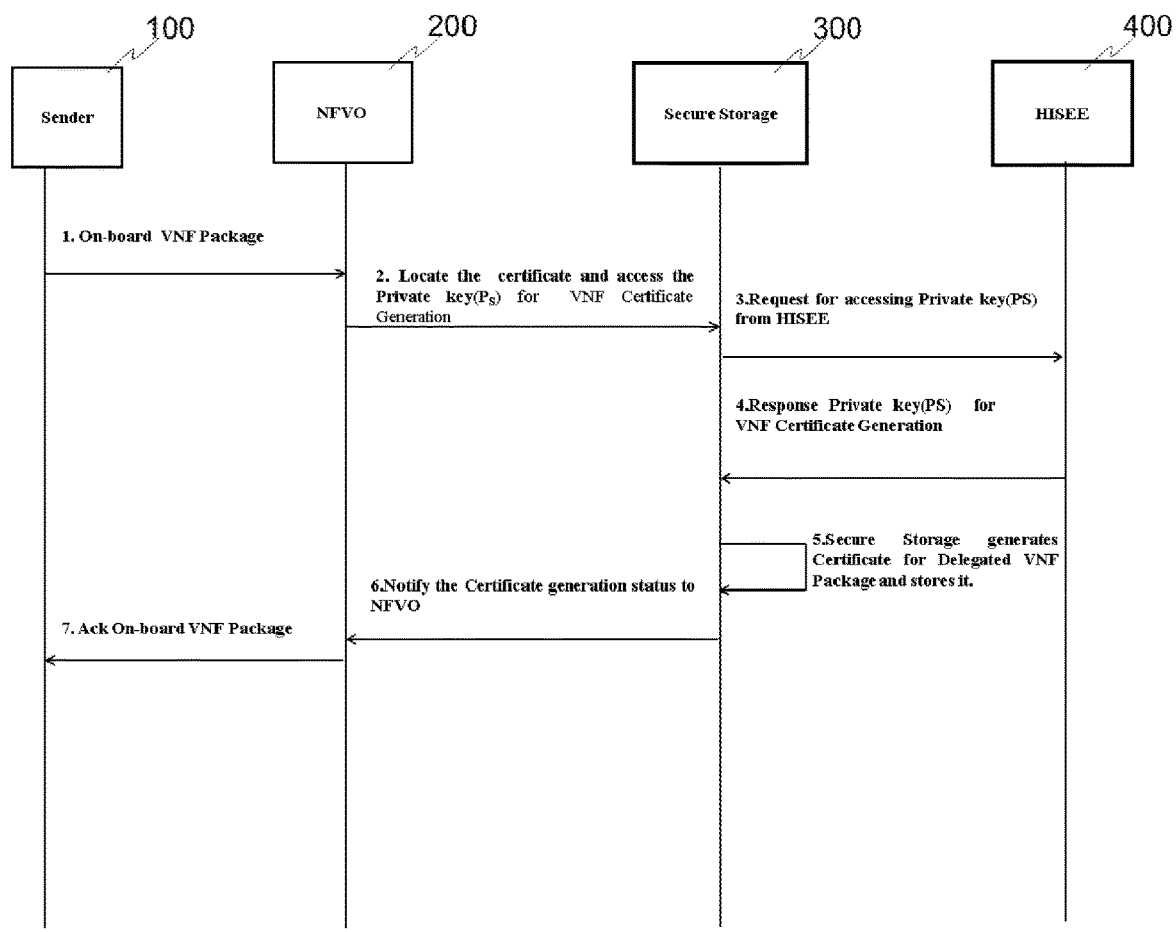

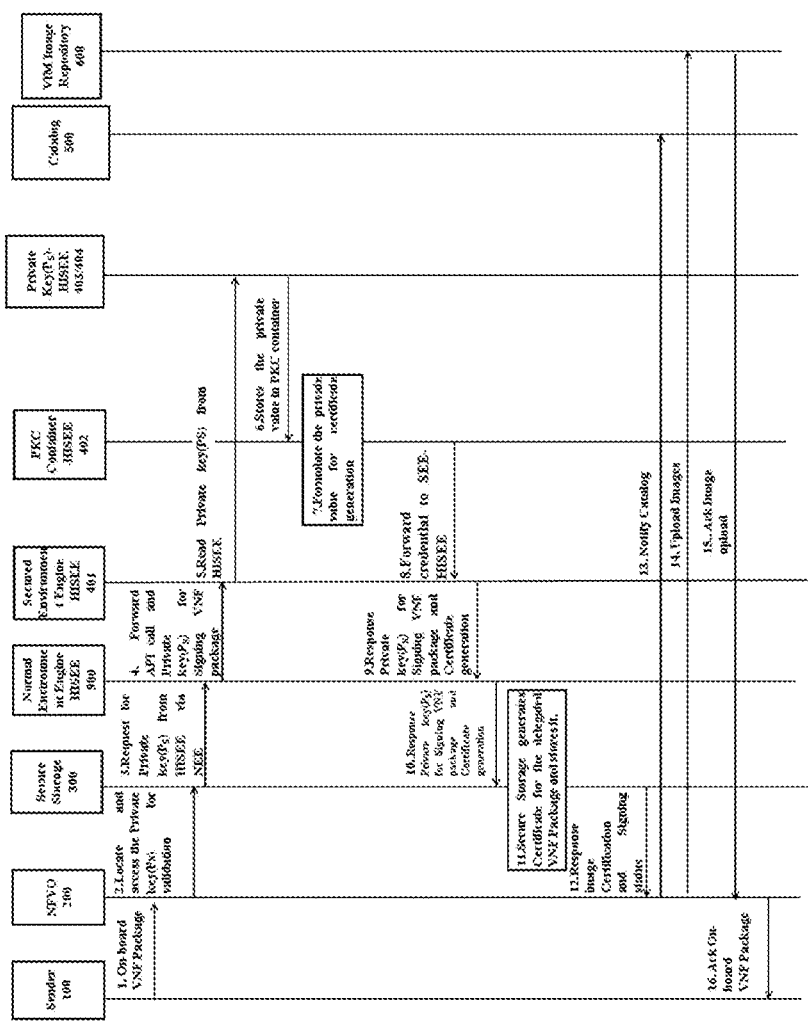
[Fig. 6]

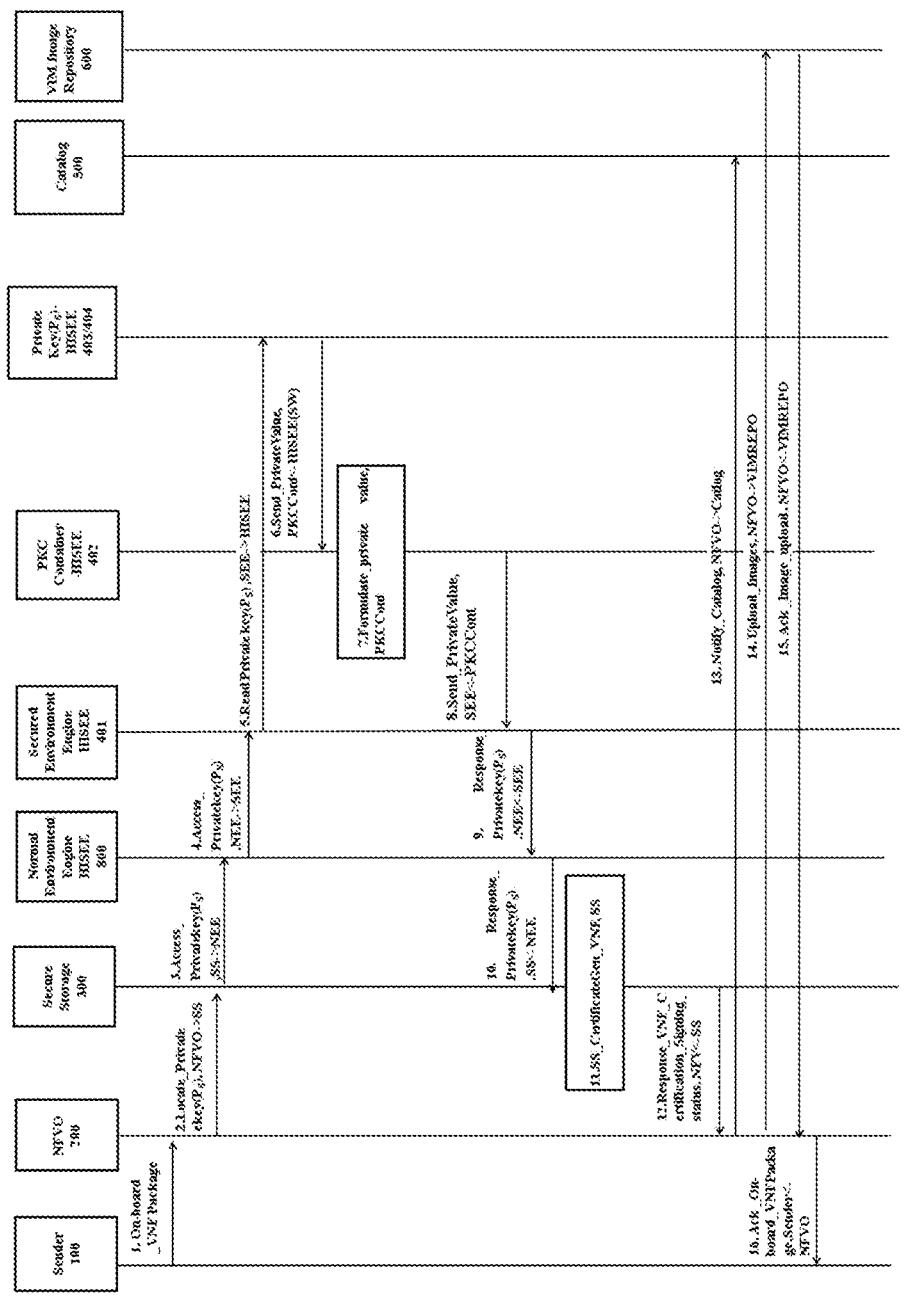
[Fig. 7]

[Fig. 8]

| Sl.No | Message | Requirement | Direction |
|---|---|---|---|
| 1 | Onboard_VNFPackage | Mandatory | Sender->NFVO |
| 2 | Locate_Privatekey($P_s$) | Mandatory | NFVO-> SS |
| 3 | Access_Private key($P_s$) | Mandatory | SS->NEE |
| 4 | Access_Private key($P_s$) | Mandatory | NEE->SEE |
| 5 | Read_Private key($P_s$) | Mandatory | SEE->HISEE |
| 6 | Send_PrivateValue | Mandatory | PKCCont<-HISEE(SW) |
| 7 | Formulate_PrivateValues | Mandatory | PKCCont |
| 8 | Send_PrivateValues | Mandatory | SEE<-PKCCont |
| 9 | Response_Private key($P_s$) | Mandatory | NEE<-SEE |
| 10 | Response_Private key($P_s$) | Mandatory | SS<-NEE |
| 11 | SS_CertificateGen_VNF, | Mandatory | SS |
| 12 | Response_VNF_Certification_Signing_status, | Mandatory | NFVO<-SS |
| 13 | Notify_Catalog,(Success/Failure) | Mandatory | NFVO->Catlog |
| 14 | Upload_Images | Mandatory | NFVO->VIMREPO |
| 15 | Ack_Image_upload | Mandatory | NFVO<-VIMREPO |
| 16 | Ack_On-board_VNFPackage | Mandatory | Sender<-NFVO |

[Fig. 9]
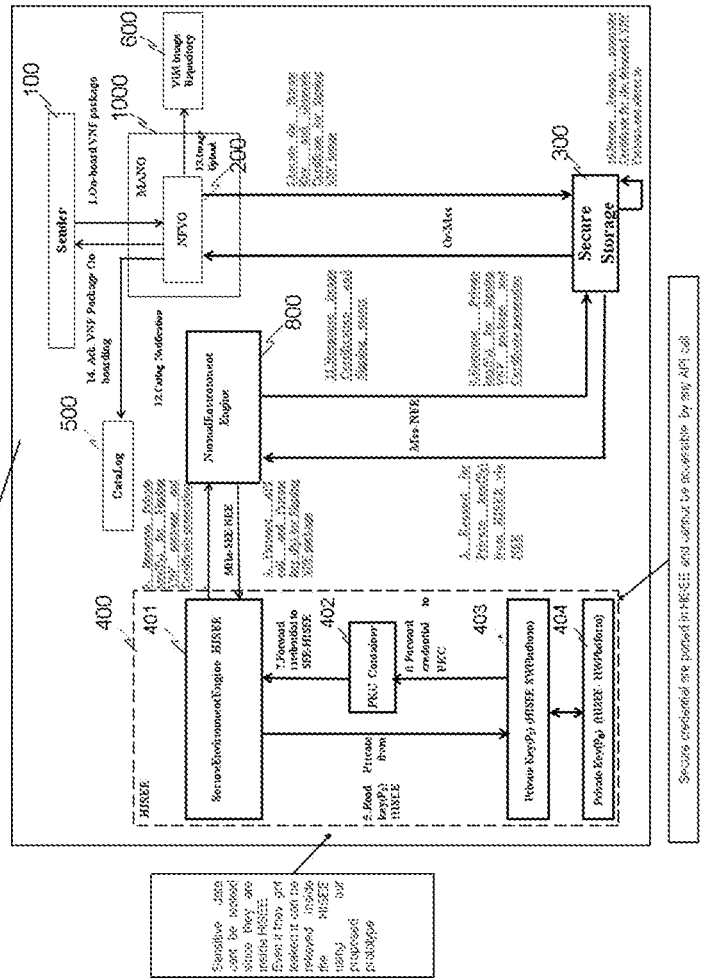

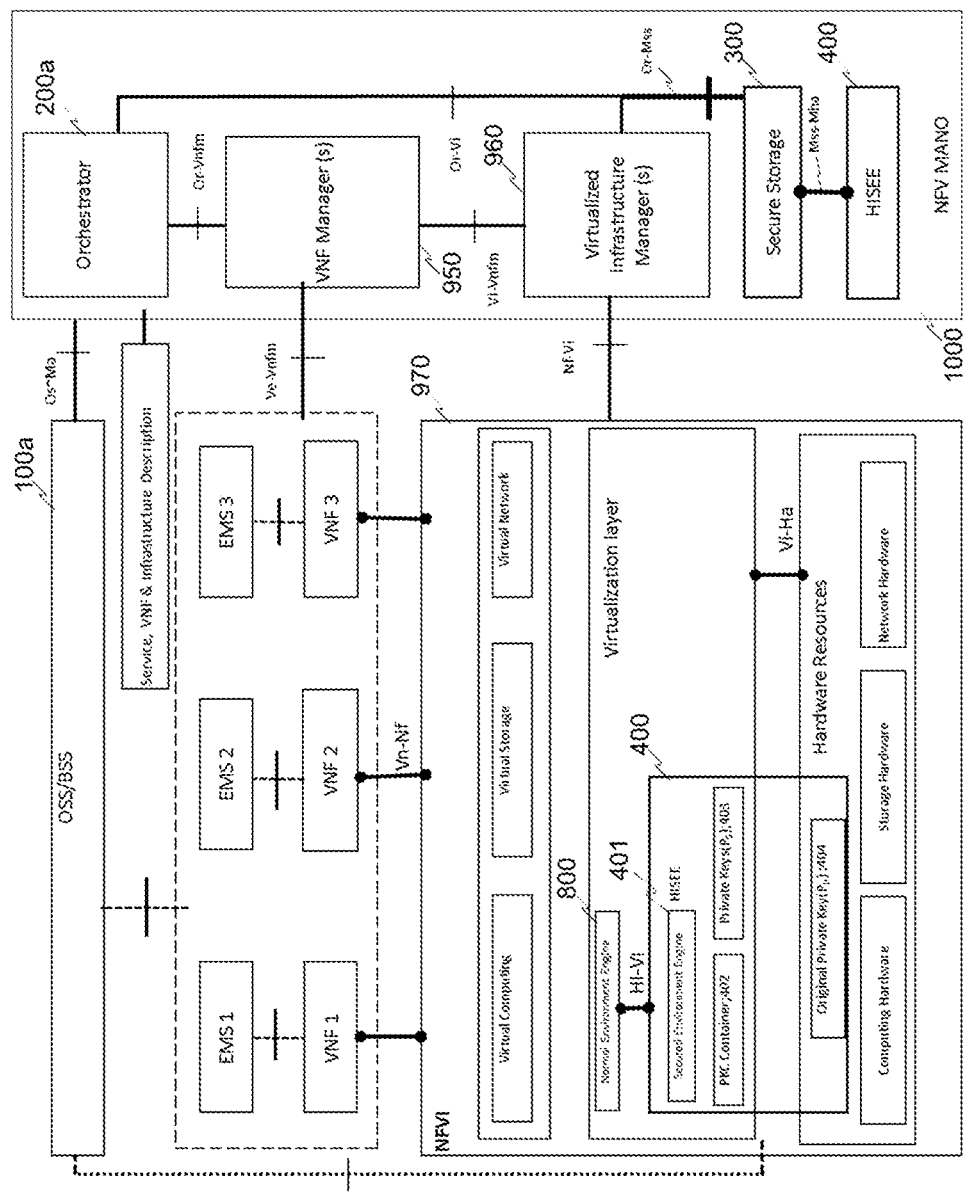
[Fig. 10]

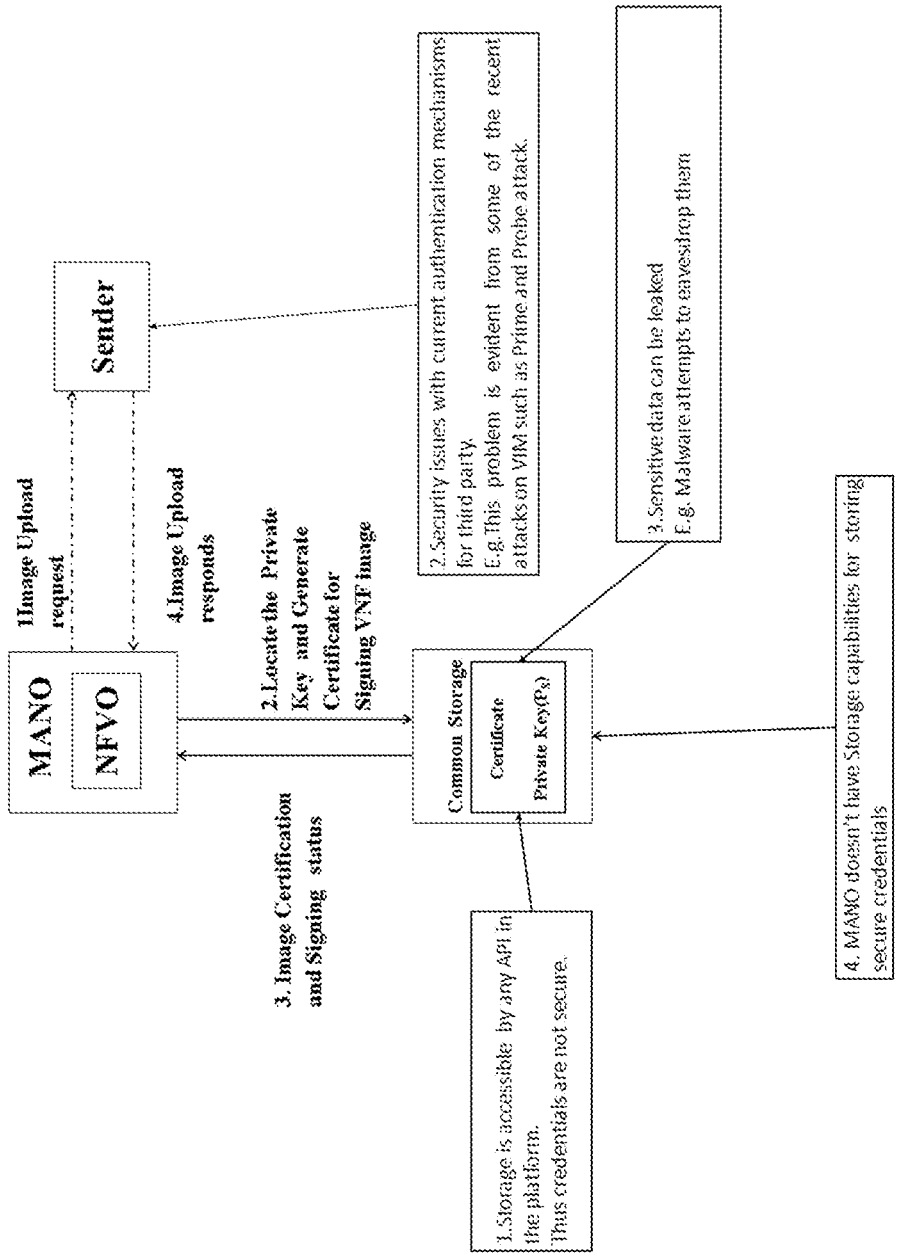
[Fig. 11]

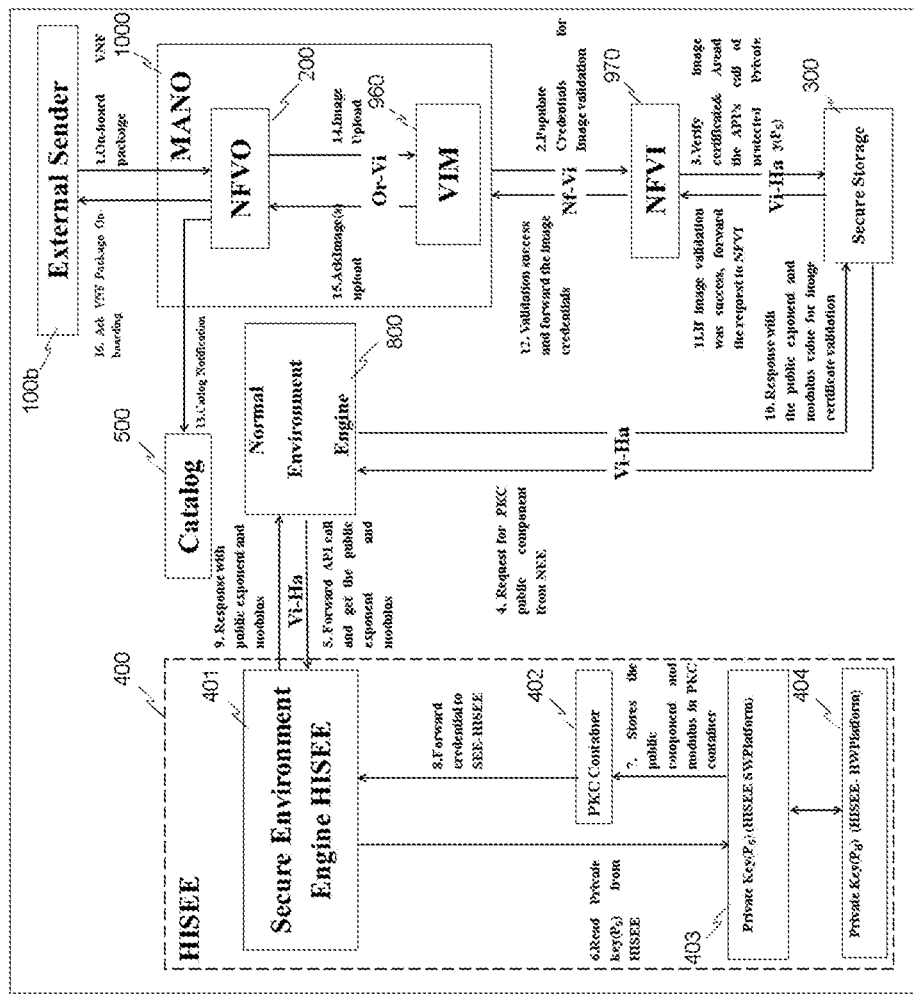
[Fig. 12]

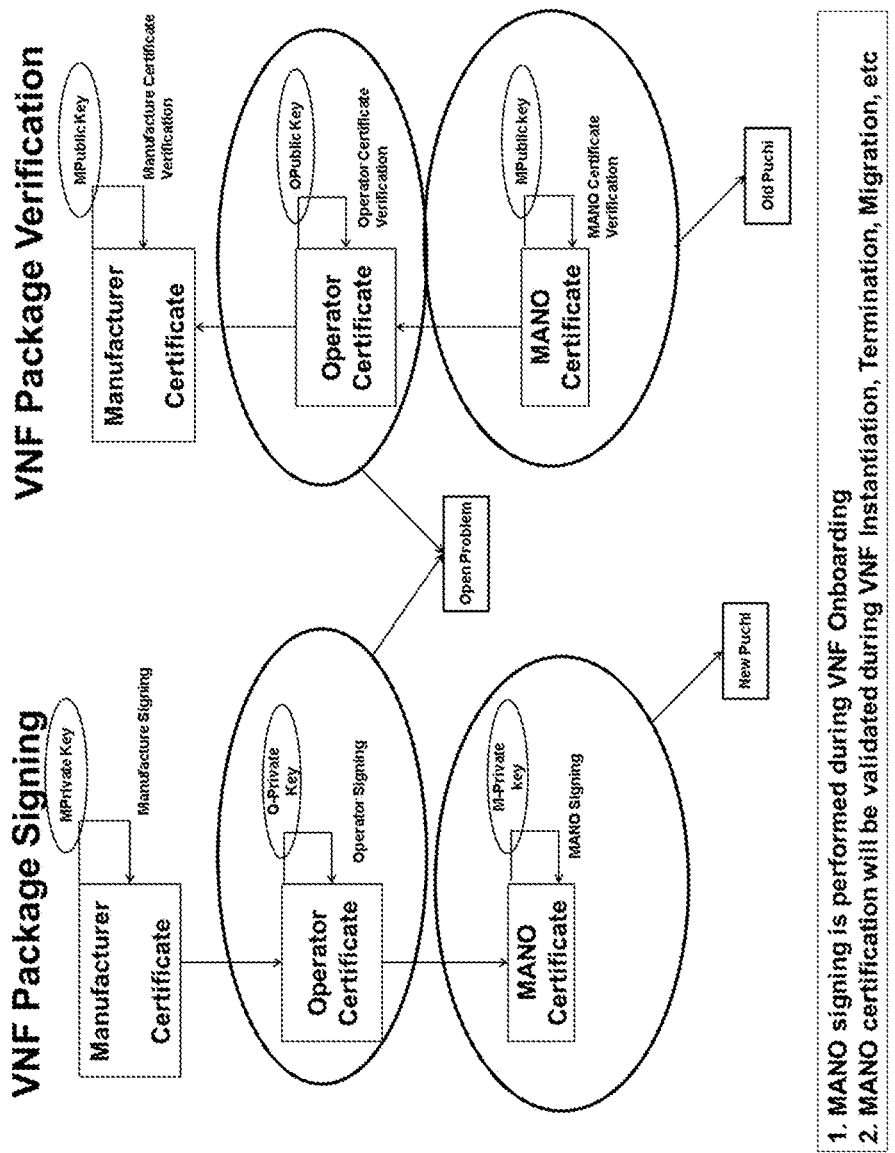
[Fig. 13]

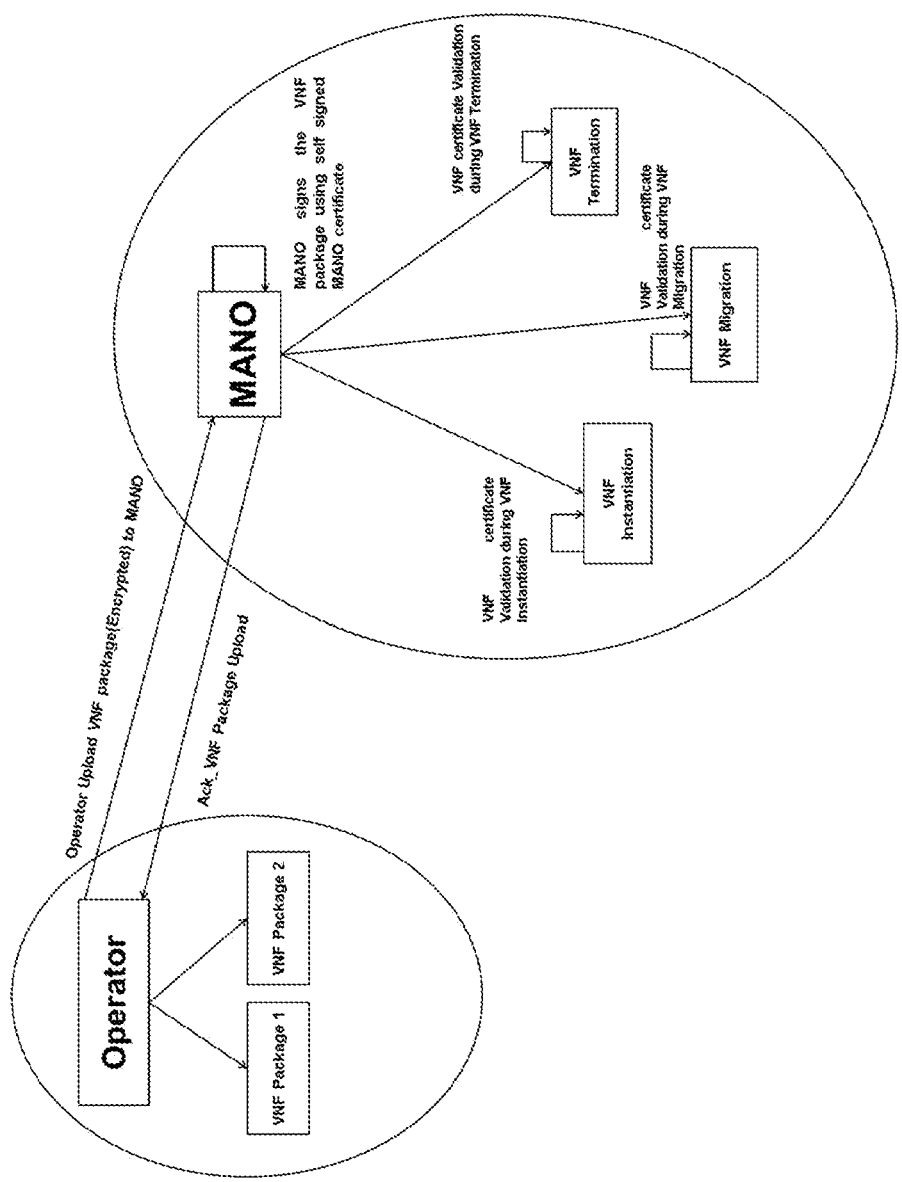
[Fig. 14]

VNF PACKAGE SIGNING SYSTEM AND VNF PACKAGE SIGNING METHOD

REFERENCE TO RELATED APPLICATION

This application is a National Stage of International Application No. PCT/JP2018/004009, filed on Feb. 6, 2018, which claims priority from Indian patent application No. 201711004439 filed on Feb. 7, 2017, the disclosure of which is incorporated herein in its entirety by reference thereto.

The present invention relates to a VNF (Virtualized Network Function) package signing method system and a VNF package signing method.

BACKGROUND

Network functions virtualization (NFV) is a unified orchestration platform that introduces unique opportunities of addressing security problems due to unprecedented scale, complex and disjointed virtual environment, flexibility and central control management.

Security is critical for NFV system, since network services and data protection are especially important for enterprise/trusted third party that are unsure whether they want to move mission-critical data and vital network functions into the cloud.

Without the obligatory assurances, enterprises or third party vendor will be reluctant to adopt NFV system based services. Therefore, NFV should provide additional security and protection for the sensitive data and their services.

Some of the attacks listed below,

Attackers eavesdrop on sensitive data on the control and bearer planes.

Attackers flood an interface/network element, resulting in a denial of service (DoS) condition in the signaling and data planes.

Attackers may forge the security images and software packages.

Fool-proofing the third party vendors or users.

[NPL 1]

European Telecommunications Standards Institute (ETSI), "Network Functions Virtualisation (NFV); Management and Orchestration", [Searched on Feb. 7, 2017], Internet, <URL: http://www.etsi.org/deliver/etsi_gs/NFV-MAN/001_099/001/01.01.01_60/gs_NFV-MAN001v010101p.pdf>

SUMMARY

FIG. 13 is a diagram for explaining problems to be solved.
FIG. 14 is a diagram for explaining problems to be solved.

1) Main Problem:

Signature of all software is verified before on-boarding.

Sometimes operators receive un-signed software from 3rd party. Such software should be verified from security perspective and signed before storage so that standard method of verification can be done before on-boarding. This invention focus on the issue of signing and secure storage of such software, for e.g. this problem is evident from some of the recent attacks on VIM such as Prime and Probe attack.

2) Supporting Problem:

Mano doesn't have the storage capabilities for storing security credentials.

Sensitive data could be leaked from Secure storage.

Secure storage is accessible by any API (Application Programming Interface) in the platform, thus crypto credentials are not secure when they are stored and accessed from Secure storage.

3) Supporting Problem:

VNF package validation check during the on-board is a crucial factor for the successful deployment of VNFs.

During the on-board, the authenticity of the VNF package is not verified.

There are more potential ways to inject malware into VNF images within a few seconds.

The existing method does not consider insider attackers as potential threats.

Hence, there is a need for authenticity during on-board of VNFs.

MANO (Management and Orchestration) doesn't have the capabilities of secure storage and HISEE to store and access the secure credentials.

Using our proposed solution, security/trust between MANO and Operators/TTP will be brought in for any kind of MANO functionalities like VNF On-boarding, etc.

Two components are proposed for MANO i.e. Secure storage and HISEE.

MANO provide secure signing of images during on-board VNF packages by the operators or trusted third party.

According to a first aspect, there is provided a VNF package signing system, comprising: an orchestration unit sending an acknowledge of receiving a VNF package including the VNF image, in response to the receiving the VNF package from a sender, a storage unit storing the VNF package and generating a certificate for the VNF package using a private key for at least generating a certificate for signing the VNF package; and a HISEE (Hardware Isolated Secured Execution Environment) unit providing the private key in response to the request from the storage unit. The orchestration unit sends the acknowledge of receiving a VNF package when the storage unit successes generating the certificate of the VNF package.

According to a second aspect, there is provided a VNF package signing method, comprising:

causing an orchestration apparatus, to send an acknowledge of receiving a VNF package including the VNF image, in response to the receiving the VNF package from a sender;

causing a storage apparatus to store the VNF package and generating a certificate for the VNF package using a private key for at least generating a certificate for signing the VNF package; and causing a HISEE (Hardware Isolated Secured Execution Environment) apparatus, to provide the private key in response to the request from the storage apparatus. The orchestration apparatus sends the acknowledge of receiving a VNF package when the storage apparatus successes generating the certificate of the VNF package.

The meritorious effects of the present invention are summarized as follows.

<Certificate Management>

MANO provide secure signing of images during on-board VNF packages by the operators or trusted third party.

VNF images can be authenticated by MANO using private components and modulus function of private key ($P_S$) from HISEE for signing VNF packages.

<Message Sequence for Various Purposes>

Deriving the private components and modulus function from the provided private key ($P_S$) for signing the VNF packages.

Handshake between Secure Storage and HISEE in MANO.

<Message Format>

Accessing the sensitive data in HISEE from MANO via Secure Storage.

Procedure for VNF image signing request forwarded between Secure Storage and HISEE.

<Key Generation>

Generation of MANO based software private key ($P_S$) for authentication or encryption mechanism required for NFV system.

BRIEF DESCRIPTION OF DRAWINGS

FIG. 1 is a block diagram showing a sequence diagram of On-boarding of VNF packages.

FIG. 2 is a block diagram of VNF Package Signing-Interaction between Sender and NFVO.

FIG. 3 is a block diagram of VNF Package Signing-Interaction between Secure Storage and HISEE.

FIG. 4 is a block diagram of VNF Package Signing during on-boarding in NFV system.

FIG. 5 is a diagram showing a sequence of On-board VNF Package signing.

FIG. 6 is a diagram showing a concrete sequence of On-board VNF Package signing.

FIG. 7 is a diagram showing a concrete sequence of On-board VNF Package signing with message format.

FIG. 8 is a diagram showing a table message format used in On-board VNF Package signing.

FIG. 9 is a diagram summarizing the proposed On-board VNF Package signing.

FIG. 10 is a block diagram showing a typical architecture for proposed On-board VNF Package signing.

FIG. 11 is a diagram for explaining another solution.

FIG. 12 is a diagram for explaining another solution.

FIG. 13 is a diagram for explaining problems to be solved.

FIG. 14 is a diagram for explaining problems to be solved.

PREFERRED MODES

Usecase for VNF Signing in NFV System
(1) Signing of VNF Package During On-Boarding
(1.1) Introduction: On-Boarding VNF Package VNF Package on-boarding refers to the process of submitting a VNF Package to the NFVO to be included in the catalogue. FIG. 1 depicts the sequence diagram of On-boarding of VNF packages. The objective is to on-board and validate the VNF package. It discusses about the process of making the MANO aware that a new VNF is available for on-boarding.

a) Procedure

1. A new VNF is uploaded by the sender and notifies the NFVO that a new VNF is available.

2. The NFVO requests the metadata (VNF Descriptor) of the new VNF.

3. The VNF Descriptor is provided to the NFVO.

4. The NFVO processes the VNFD to check if the mandatory elements are provided.

5. The NFVO uploads the VNFD to the VNF Catalogue.
(1.2) VNF Package Signing During On-Boarding
a) Problem:

VNF package signing during the on-board is a crucial factor for the successful deployment of VNFs. During the on-board, the authenticity of the VNF package is not verified. There are more potential ways to inject malware into VNF images within a few seconds. The existing method does not consider insider attackers as potential threats. Hence, there is a need for authentication during on-board of VNFs.

b) Description:

NFV Package on-boarding refers to the process of submitting VNF Package to the NFVO 200 that will be included in the catalogue 500. FIG. 4 depicts the block diagram of VNF packages signing using certificate management. The objective of the usecase is to certify the VNF package that shall provide authenticity and integrity protected by the MANO 1000 using our proposed mechanism. Below we have provided the step by step VNF signing procedure by any internal or external user. This block diagram consists of MANO components, HISEE (Hardware Isolated Secured Execution Environment) 400, Secure environment engine (SEE) 401, Normal environment engine (NEE) 800, PKC container 402, Private Key (PS) (HISEE SW Platform; HISEE Software Platform) 403, Private Key (PH) (HISEE HWPlatform; HISEE Hardware Platform) and Secure storage 300.

Secure storage 300 is the chained encrypted storage with the unique key embedded that stores the certificates, licenses and crypto keys data. Moving the raw data of the secure storage into other devices fails to access it.

HISEE (Hardware Isolated Secured Execution Environment) 400 consists of a hardware-enforced security environment that provides both security services and interfaces to other components as a trusted chain. HISEE separates two parallel execution environment such as secure environment engine (SEE) and normal environment engine (NEE). HISEE consists of a secure environment engine (SEE) 401 and Public key container (PKC) 402, Private Key ($P_S$) (HISEE SWPlatform) 403 and Private Key ($P_H$) (HISEE HWPlatform) 404. The detail description of NFVO 200, VIM and NFVI can be referred from clause 5.4.2 in ETSI GS NFV MAN 001 (NPL1). The step by step authentication procedures for On-boarding VNF packages using certificate signing is given in sub-sections below.

c) Interaction Between Sender and NFVO

FIG. 2 depicts the block diagram of VNF Package Signing-Interaction between Sender 100 and NFVO 200.

d) Interaction Between Secure Storage and HISEE

FIG. 3 depicts the block diagram of VNF Package Signing-Interaction between Secure Storage 300 and HISEE 400.

i. Normal environment engine (NEE) 800 is a non-secure execution environment which forwards the request from normal environment engine 800 to the HISEE components.

ii. Secure environment engine (SEE) is a trusted, certifiable secure environment which forwards the request from secure storage 300 to the SEE 401.

iii. PKC container 402 stores and extracts the public exponent and modulus value of the Private Key ($P_S$) (HISEE SW Platform) 403.

iv. Private Key ($P_S$) (HISEE SW Platform) is a type of software based private key stored in HISEE 400.

v. Private Key ($P_H$) (HISEE HW Platform) 402 is a type of hardware based private key stored in HISEE 400.

e) Overall Block Diagram

FIG. 4 depicts the block diagram of VNF Package Signing during on-boarding in NFV system.

f) Overall Usecase: Method to Secure the Private Key in HISSE During VNF Package Signing FIG. 5 depicts the diagram showing a sequence of On-board VNF Package signing. FIG. 6 depicts the diagram showing a concrete sequence of On-board VNF Package signing.

g) Procedure:

Step 1: VNF package is submitted by Sender 100 to NFVO 200 for On-board VNF Package.

Step 2: NFVO 200 signs the VNF package using proposed protocol.

Step 3: NFVO 200 forwards the request to Secure Storage 300 for Signing VNF package.

Step 4: Secure Storage 300 initiates for VNF authentication and API's of private key ($P_S$) for Certificate generation.

Step 5: API's of the private key ($P_S$) forwards the call to the normal environment engine (NEE) 800 to get the private key ($P_S$).

Step 6: The normal environment engine 800 will map the request to secured environment engine (SEE) 401 which is located in secured environment.

Step 7: The secured environment engine (SEE) 401 reads the private key (PS) which is located in HISEE.

Step 8: Secured environment engine (SEE) 401 formulated the private component value for the given authentication request and forward the credentials to normal Environment engine (NEE) 800.

Step 9: Normal Environment engine 800 responses to Secure Storage API's call with private component value of the private key ($P_S$).

Step 10: Secure storage 300 generates certificate and signs the VNF package using the private component value of the private key ($P_S$) and erases it permanently.

Step 11: Secure Storage 300 acknowledges NFVO 200 for successful certificate generation and VNF signing.

Step 12: NFVO 200 notifies the catalogue 500 an upload the image in VIM repository.

Step 13: NFVO 200 acknowledges the VNF Package on-boarding to the sender 100.

FIG. 7 is a diagram showing a concrete sequence of On-board VNF Package signing with message format. FIG. 8 is a diagram showing a table message format used in On-board VNF Package signing.

1. Onboard_VNFPackage, Sender→NFVO

This message defines the Onboard VNF image by Sender 100 to NFVO 200.

2. Locate_Privatekey ($P_S$), NFVO→SS

This message defines the NFVO 200 locate the private key's API in Secure Storage 300.

3. Access_Private key ($P_S$), SS→NEE

This message defines the forwarding of API call to request the private component of the private key from SS 300 to NEE 800.

4. Access_Private key ($P_S$), NEE→SEE

This message defines the forwarding of API call to request the private component of the private key from NEE 800 to SEE 401.

5. Read_Private key ($P_S$), SEE→HISEE

This message defines of extracting the private components value of the private key from SEE 401 to HISEE 403/404.

6. Send_PrivateValue, PKCCont←HISEE (SW)

This message defines of storing the private components value of the private key in PKC container 402.

7. Formulate_PrivateValues, PKCCont

This message defines of formulating the private components in PKC container 402.

8. Send_PrivateValues, SEE←PKCCont

This message defines of forwarding the private components value of the private key from PKC Container 402 to the SEE 401.

9. Response_Private key ($P_S$), NEE←SEE

This message defines of forwarding the private components value of the private key from SEE 401 to NEE 800.

10. Response_Private key ($P_S$), SS←NEE

This message defines of forwarding the private components value of the private key from NEE 800 to secure storage (SS) 300.

11. SS_CertificateGen_VNF, SS

This message defines the VNF certificate generation and signing in Secure storage 300 using the private components value of the private key.

12. Response_VNF_Certification_Signing_status, NFVO←SS

This message defines the certificate generation and signing status of the VNF from secure storage (SS) 300 to NFVO 200.

13. Notify_Catalog, NFVO—Catalog

This message defines the certificate generation and signing status of the VNF image from NFVO 200 to catalogue 500.

14. Upload_Images, NFVO—VIMREPO

This message defines the VNF image upload status from NFVO 200 to VIM repository 600.

15. Ack_Image_upload, NFVO←VIMREPO

This message defines the acknowledgment status of VNF image upload from VIM repository 600 to NFVO 200.

16. Ack_On-board_VNFPackage, Sender←NFVO

This message defines the acknowledgment status of on-boarding VNF image from NFVO 200 to sender 100.

FIG. 9 is a diagram summarizing the proposed On-board VNF Package signing.

FIG. 10 is a block diagram showing a typical architecture for proposed On-board VNF Package signing.

The highlighted secure storage 300 and HISEE 400 are added to the typical architecture of NFV MANO. In addition, interfaces shown by reference points Or-Mss and Mss-Mha are added. As shown in the NFVI box in the left side, secure environment engine 401, PKC Container 402, private keys (Ps) (HISEE SE platform) 403 and normal environment engine 800 could be realized in the virtualization layer by VIM 960. On the other hand, the original private keys ($P_H$) that correspond to private keys ($P_H$) (HISEE HW platform) 404 is arranged in Hardware resources to be isolated.

In the aforementioned modes, the following assumptions are put.

The private key of the certificate is stored securely in HISEE 400 which is used during certificate generation.

Sender 100 may be referred as NF store.

The VNF signing and certificate generation are performed during the upload of VNF packages.

Followings are explanations of the solutions to compare with the preferred mode of present invention (see FIGS. 11 and 12).

Title 1: System and Method for Usage of a Role Certificate in Encryption and as a Seal, Digital Stamp, and Signature This role certificate has policies associated with it and may be utilized for both encryption and as a digital signature.

Individuals in a group share the same role certificate and can sign on behalf of the group.

Individuals may decrypt messages sent to the group or any member of the group which have been encrypted using the role certificate.

A key recovery authority is utilized to recover expired role certificates.

Title 2: Certificate-Based Authentication System for Heterogeneous Environments

Methods and apparatus for an operator of a console to authenticate to a system of heterogeneous computers by logging in only once to a representative computer or "core".

After logging in, the operator acquires a session certificate, allowing the operator to prove identity and group membership information to other nodes on a network.

Before signing session certificates, embeds data in an extended data area of the certificates.

The username, group membership, and other extended data is based on the namespace of the core computer, and other devices on the network need not belong to that namespace or even use the same network operating system.

Manageable devices can authenticate and authorize access to themselves based on the extended data submitted to them by the bearer of a session certificate.

Authenticity and ownership of the certificate is verified using standard public key crypto system methods.

As described above, according to the present exemplary embodiment, it is possible to provide secured environment for usage of VNF.

Descriptions of the respective exemplary embodiments of the present disclosure have been given above, but the present disclosure is not limited to the abovementioned respective exemplary embodiments, and modifications, substitutions, and adjustments are possible. Furthermore, the present disclosure may be implemented by arbitrarily combining the respective exemplary embodiments. Namely, the present disclosure includes various types of transformation and modification or variation that could be conceived by a person skilled in the art, in accordance with the entire disclosure including the scope of the claims and to technical concepts thereof.

For example, while the term HISEE is used in the above exemplary embodiment, the equivalent scheme to HISEE such as HMEE (hardware mediated secure enclaves; see NFV-SEC 012 V3.1.1) is applicable to the present invention.

The respective disclosures of the Non Patent Literature described above are hereby incorporated by reference into this application. The exemplary embodiments and examples may be changed and adjusted within the bounds of the entire disclosure (including claims) of the present invention and based on fundamental technological concepts thereof. Furthermore, a wide variety of combinations and selections of various disclosed elements (including respective elements of the respective claims, respective elements of the respective exemplary embodiments and examples, respective elements of the respective drawings, and the like) is possible within the scope of the claims of the present invention. That is, it is to be understood that the present invention includes every type of transformation and modification (variation) that a person skilled in the art can realize according to the entire disclosure including the scope of the claims and to technological concepts thereof.

REFERENCE SIGNS LIST 100 sender
100a OSS/BSS
100b external sender
200 NFVO
200a Orchestrator
300 secure storage (SS)
400 HISEE
401 secured environment engine (SEE)
402 PKC container
403 private key (Ps) (HISEE SW platform)
404 private key ($P_H$) (HISEE HW platform)
500 catalog
600 VIM image repository
800 normal environment engine (NEE)
950 VNF Manger
960 Virtualized Infrastructure Manager (VIM)
970 NFVI
1000 (NFV) MANO

The invention claimed is:

1. A VNF (Virtualized Network Function) package signing system, comprising:
at least a memory; and
at least a processor configured to execute instructions stored in the memory to implement:
a storage storing a VNF package and generating a certificate for the VNF package using a private key for at least generating a certificate for signing the VNF package, wherein the VNF package is received from a sender and includes a VNF image;
a HISEE (Hardware Isolated Secured Execution Environment) providing the private key in response to a request from the storage;
an orchestrator that sends an acknowledgment of receiving the VNF package at a time the storage successfully generates the certificate of the VNF package; and
a VIM (VNF Infrastructure Manager) and a NFVI (Network Function Virtualization Infrastructure),
wherein the VNF package signing system works as a NFV-MANO (Network Functions Virtualization Management and Orchestration) system with VNF signing function.

2. The VNF package signing system according to claim 1; wherein the HISEE comprises a secure environment engine reading the private key from a HISEE software platform.

3. The VNF package signing system according to claim 2; wherein the secure environment engine provides application programing interface and provides the private key in response to an API call including request for the private key.

4. The VNF package signing system according to claim 2, further comprising:
a Normal environment engine relays a message between the storage and the secure environment engine.

5. The VNF package signing system according to claim 1; wherein the orchestrator notifies the certificate generation of the VNF image to a predetermined VNF catalog at the time the storage successfully generates the certificate of the VNF package.

6. The VNF package signing system according to claim 1; wherein the orchestrator stores the VNF image to a predetermined VIM (VNF Infrastructure Manager) image repository at the time the storage successfully generates the certificate of the VNF package.

7. A VNF (Virtualized Network Function) package signing method, comprising:
causing a storage to store a VNF package and generating a certificate for the VNF package using a private key for at least generating a certificate for signing the VNF package, wherein the VNF package is received from a sender and includes a VNF image;
causing a HISEE (Hardware Isolated Secured Execution Environment), to provide the private key in response to a request from the storage; and
causing an orchestrator to send an acknowledgement of receiving the VNF package at a time the certificate of the VNF package is successfully generated,
wherein a VIM (VNF Infrastructure Manager) and a NFVI (Network Function Virtualization Infrastructure) are further used, and wherein a VNF package signing system works as a NFV-MANO (Network Functions Virtualization Management and Orchestration) system with VNF signing function.

8. The VNF package signing method according to claim 7;
wherein the HISEE comprises a secure environment engine reading the private key from a HISEE software platform.

9. The VNF package signing method according to claim 8;
wherein the secure environment engine provides application programing interface and provides the private key in response to an API call including request for the private key.

10. The VNF package signing method according to claim claim 8;
wherein a Normal environment engine relays a message between the storage and the secure environment engine.

11. The VNF package signing method according to claim 7;
wherein the orchestrator notifies the certificate generation of the VNF image to a predetermined VNF catalog at the time the storage successfully generates the certificate of the VNF package.

12. The VNF package signing method according to claim 7;
wherein the orchestrator stores the VNF image to a predetermined VIM (VNF Infrastructure Manager) image repository when the storage succeeds generating the certificate of the VNF package.

13. A non-transitory recording medium storing program instructions to implement a VNF (Virtualized Network function) package signing method, the program instructions comprising:
causing a storage to store a VNF package and generating a certificate for the VNF package using a private key for at least generating a certificate for signing the VNF package, wherein the VNF package is received from a sender and includes a VNF image; and
causing a HISEE (Hardware Isolated Secured Execution Environment) to provide the private key in response to a request from the storage; and
causing an orchestrator to send an acknowledgment of receiving the VNF package at a time the storage successfully generates the certificate of the VNF package,
wherein a VIM (VNF Infrastructure Manager) and a NFVI (Network Function Virtualization Infrastructure) are further used, and
wherein a VNF package signing system works as a NFV-MANO (Network Functions Virtualization Management and Orchestration) system with VNF signing function.

14. The non-transitory recording medium according to claim 13;
wherein the HISEE comprises a secure environment engine reading the private key from a HISEE software platform.

15. The non-transitory recording medium according to claim 13;
wherein the secure environment engine provides application programing interface and responses the private key in response to an API call including request for the private key.

16. The non-transitory recording medium according to claim 14;
wherein a Normal environment engine relays a message between the storage and the secure environment engine.

17. The non-transitory recording medium according to claim 13;
wherein the orchestrator notifies the certificate generation of the VNF image to a predetermined VNF catalog at the time the storage successfully generates the certificate of the VNF package.

18. The non-transitory recording medium according to claim 13;
wherein the orchestrator stores the VNF image to a predetermined VIM (VNF Infrastructure Manager) image repository when the storage succeeds generating the certificate of the VNF package.

* * * * *